D. Matthew:
Spark Arrester.
No. 248. Reissued Oct 4. 1853.
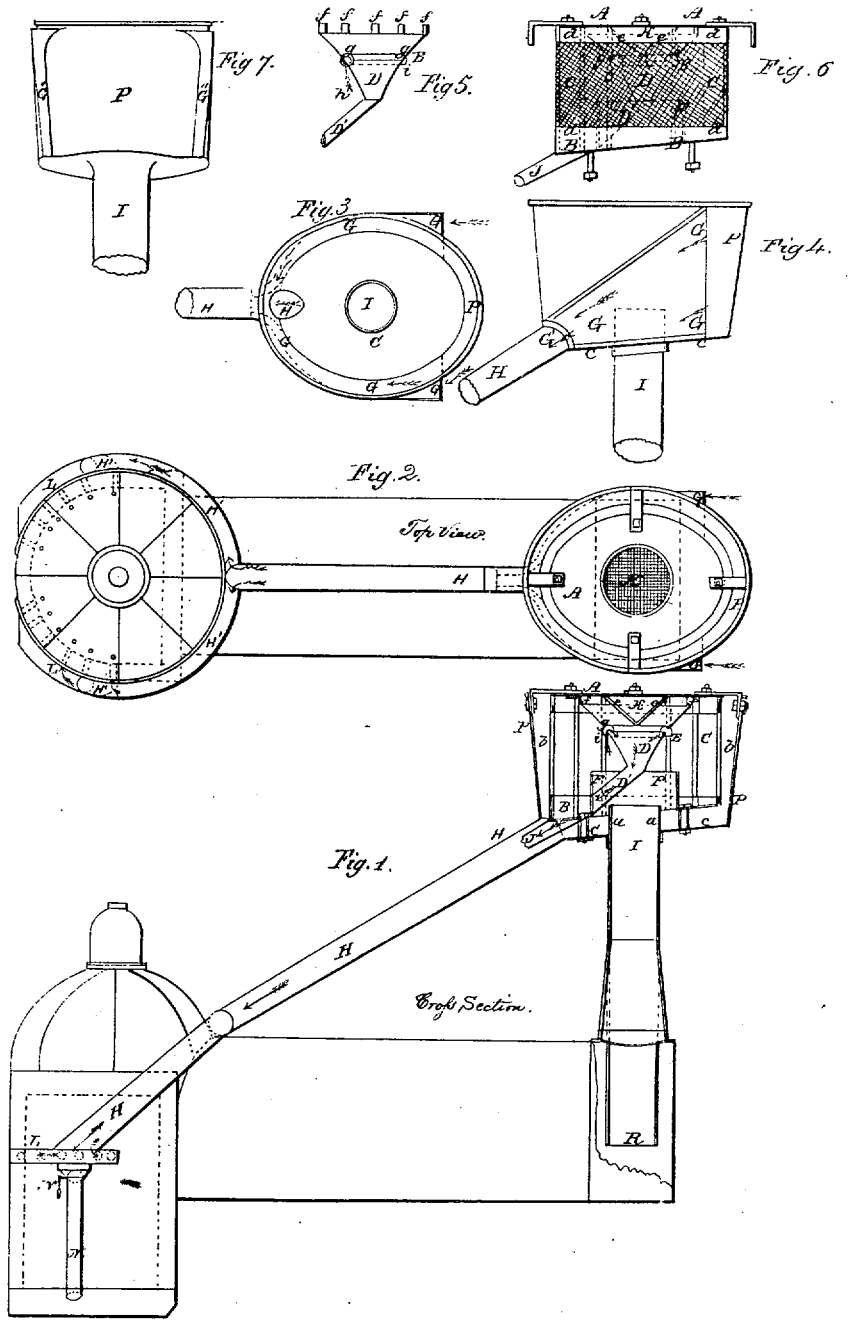
Witnesses.
Charles D. Freeman
John L. Hendrick
Inventor.
David Matthew

UNITED STATES PATENT OFFICE.

DAVID MATTHEW, OF PHILADELPHIA, PENNSYLVANIA.

IMPROVEMENT IN SPARK AND GAS CONSUMERS.

Specification forming part of Letters Patent No. 6,116, dated February 20, 1849; Reissue No. 248, dated October 4, 1853.

*To all whom it may concern:*

Be it known that I, DAVID MATTHEWS, formerly of the city of Baltimore, in the State of Maryland, now of the city of Philadelphia, in the State of Pennsylvania, have invented certain new and useful improvements in the manner of constructing an apparatus to be used on locomotive steam-engines for the purpose of preventing the escape of sparks out into the air, of causing their consumption, together with that of a portion of ignitible gas, and of aiding in the generating of steam, which instrument I denominate the "Spark and Gas Consumer;" and I do hereby declare that the following is a full and exact description thereof.

On the upper end of the chimney of the locomotive I place a case of sheet metal, which I make of an oval form—say forty-five by thirty-five inches in diameter, and thirty inches (more or less) in height. The lower plate of the case is firmly secured to the chimney of the locomotive, so that all the volatile products of combustion from the fire enter it. This case is open at the top, and is to contain the apparatus by which the sparks are made to pass, with the gases, into the upper part of the fire-box through a tube leading from the above-named outer case to the fire-box. The sparks thus disposed of undergo, in conjunction with the combustible gases, complete combustion, to aid in which a portion of atmospheric air is admitted in conjunction with said sparks and gases in a manner to be presently described. When bituminous coal or other heavy fuel is used, and the sparks would remain in the smoke-box, in order to cause the sparks to ascend from the smoke-box into the chimney and become arrested by the apparatus, I extend the chimney down into the smoke-box, so that its open end or mouth shall be near to the sparks that lie in the bottom of the box. The exhaust-pipes present their mouths below this opening of the chimney, directed upward, and discharge the exhaust-steam up the chimney. This chimney-section thus extended into the smoke-box, by its position and the power of the exhaust, draws up the sparks that would otherwise be left in the box in an ignited state and injure it and obstruct the lower flues.

In the accompanying drawings, Figure 1 is a side elevation of a locomotive-boiler and fire-box, the chimney and apparatus which is placed on the top of the chimney being shown in section. Fig. 2 is a top view of the same, containing the apparatus within the outer case. Fig. 3 is a top view of the outer case, with the apparatus which it is to contain removed. Fig. 4 is a side elevation of the outer case, together with the tubes or pipes that are to supply the atmospheric air. Fig. 5 is a side view of what I have called a "trumpet-mouthed pipe," making a part of the apparatus that is to be contained within the outer case. Fig. 6 is a side view of the inside case or apparatus that is to be contained within the outer case.

P P is the outer case, of which C C is the bottom that is firmly riveted to the chimney *i*, that enters it to the height, say, of six inches, as shown at *a a*, Fig. 1. This outer case is open at top, and from its lower part proceeds a tube, H H, leading to the fire-box, which tube may be six inches (more or less) in diameter. The outer case, P, is furnished on its exterior with two tubes that are to conduct atmospheric air into the tube H. These pass from the rear toward the fore part, and on the outside of the case P, as shown at G G G, Fig. 4. They are flattened, so as to leave a space of two inches (more or less) between them and the outer case, but widening out at their forward termination, where they are open, as seen at G″ G″, Fig. 7, which shows the forward end of the case P. The tubes G G on each side of the case meet at its rear end and enter the tube H, as shown at G′, Fig. 4, leaving a space in the center for the entrance of the sparks and gases from the apparatus contained within the case P P, which apparatus I will now proceed to describe.

A A in the respective figures is the top plate of the inner case or apparatus, and B B its bottom plate, both of which are oval, and may be forty by thirty inches in their respective diameters, leaving a space, *b b*, of two or three inches all around between the inner and outer cases. The inner case is surrounded by wire-gauze, as shown at *c c*, Fig. 6, which may be made fast to flanges *d d*, rising from the lower and descending from the upper plate, said plates being held apart by rods extending from one of them to the other. The bottom plate B B has an inclination, say, of four or more inches from its forward to its rear end, constituting an inclined plane leading to the pipe J, that enters the pipe H at G′, it being considerably smaller than the pipe H. There is an opening through the plate B B, say, of twenty inches in diameter, and a circular rim or open tube, F F, rises from this opening to about the height of twelve inches. The bottom plate B B of the inner case may be about five inches above the bottom plate C C, Fig. 1, of the outer case, and this last plate is to be parallel to the plate B B, so as to have a like inclination toward the tube H.

D D′ is the trumpet-mouthed pipe, (shown separately in Fig. 5.) The upper portion or mouth of this stands immediately below an opening, K, through the center of the top plate, A, of the inner case, which opening may be about fifteen inches in diameter, and is to be closed or covered with wire-gauze, forming an obtuse inverted cone, as shown by the lines *e e*, Figs. 1 and 6. The trumpet-mouthed tube is not in contact with the plate A A, but is connected to it by short rods or studs *f f*, Figs. 1 and 5, so as to allow a space between them. The trumpet-mouth portion of this tube consists of two parts divided horizontally from each other near its upper end, as at E, Figs. 1, 5, and 6. To the upper portion is attached a curved flange, E, Figs. 1, 5, which is in the form of the upper section of a tubular ring divided horizontally through its middle, and between the two sections of the trumpet-mouthed tube there is a passage, as indicated by the arrow *h* E, Fig. 5, through which the draft and sparks may pass from the outside to the inside of the said trumpet-mouthed tube, the curvature of the flange *g* E, Figs. 1, 5, serving to direct said draft directly down toward the tube D′, through which it is forced by the exhaust-steam into the tube H, the open end of D′ being opposite to the tube J. The two sections of the trumpet-mouthed tube D are connected together at intervals by short studs or thimbles, offering but little obstruction to the draft passing between them.

The tube H, when it meets the boiler, divides into two branches, H′ H′, Fig. 2. These branches each enter a hollow box or case, L, made fast to the outside of the fire-box. From these cases there are holes made into the interior of the fire-box, as shown by the dotted lines *o o o*, Fig. 2, their places being indicated also by the dotted lines *o o o*, Fig. 1. Of these there may be twelve or any other preferred number, each of which may be about an inch and a half in diameter.

From the under sides of the cases L descends a tube, M, that enters the ash-pan, and at the upper end of this tube there is a valve, N, which may be opened or closed at pleasure. The use of it is to carry off the water, which, when the engine is foaming, may be carried into the case, and which without the provision of the pipes M would pass into the fire; but by opening the valve N it will be thrown into the ash-pan without injuring the fire.

The chimney I is extended down in the smoke-box to within about fifteen inches of the bottom of the box, and the exhaust-pipes do not pass through the sides of this extension of chimney to discharge into it, as this would obstruct the draft, but present their mouths to its lower end and exhaust up it. This extension-piece R, Fig. 1, shown in the original patent by the dotted lines, is here shown in section, and is necessary to be constructed with the exhaust-pipes, as described and shown, to remove the heavy sparks from the smoke-box, to be arrested and consumed.

The following is the operation of the apparatus: When the engine is at work and the exhaust-steam is passed into the chimney in the usual manner from the exhaust-pipes, as described, the sparks and heated air enter the lower end, R, of the chimney I, and this current of heated air and sparks will be thrown against the outer surface of the trumpet-mouthed tube, and as they slide up this they encounter the opening between the two sections of said tube at E, and are, by the curvature of the flange *g*, made to descend toward the pipe D, from which they pass into the tube H. To insure their so doing, the flange *g* is extended down on the outside, as at *i*. The heated air passing through this opening E will escape in part through the tube D, and also in great part through the wire-gauze in the top of the apparatus at K, and in part between the trumpet-mouthed tube D and plate A, Figs. 1, 5, 6, into the main case through the wire-gauze which surrounds the inner case. The sparks that escape the opening at E, and which pass higher up the trumpet-mouthed tube, will strike the plate A and fall down on the inclined plate B and be passed with the current of air and with the other sparks through the tube H into the fire-box. The forward motion of the engine causes the tubes G G to operate as blowers in driving the sparks and gas through the tube H, supplying the oxygen necessary to their perfect combustion. By this means, instead of being wasted and becoming an annoyance, they become a part of the fuel and increase the heat. The space between the plates B and C and between the inner and the outer casings generally has been found ample for the discharge of the smoke, steam, and gases without obstruction.

Having thus fully described the manner in which I construct my spark and gas consumer and shown the manner in which the same operates, what I claim therein as new, and desire to secure by Letters Patent, is—

1. The manner in which I have constructed and arranged the respective parts that constitute the inner and outer cases of the apparatus which is placed at the top of the chimney.

2. The manner of constructing and arranging the trumpet-mouthed tube D within the inner case, said tube being divided into two or more parts, and being made to deposit and discharge the larger portion of the sparks by the aid of the opening between said parts, as described, substantially as set forth.

3. The manner in which I connect the apparatus at the top of the chimney with the furnace or fire-box by means of the tube or pipes H, the cases L L, and the openings, thence into the fire-box or furnace, for the purpose made known.

4. The manner of preventing the entrance of water into the fire-chamber by the employment of the tubes M, in combination with the tubes H H′.

DAVID MATTHEW.

Witnesses:
CHARLES D. FREEMAN,
JOHN L. FREDERICK.